Patented Mar. 6, 1945

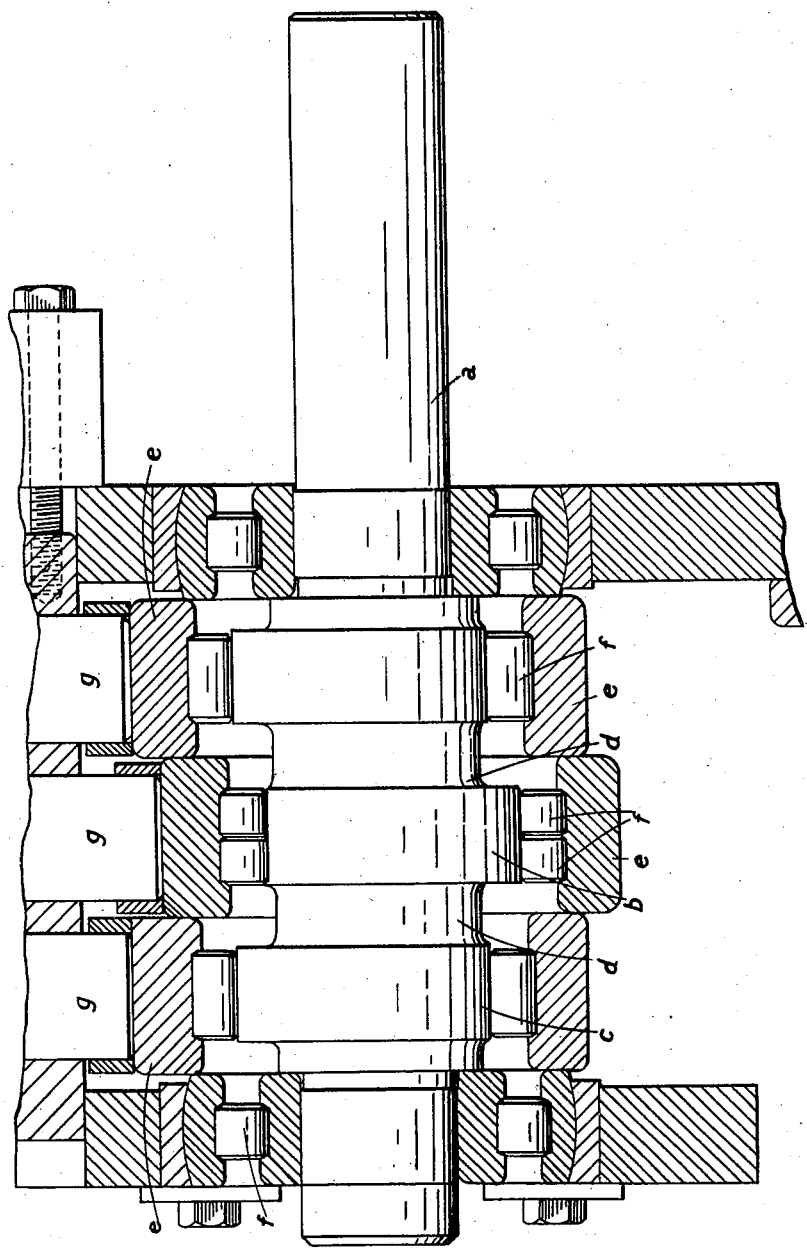

2,370,760

UNITED STATES PATENT OFFICE 2,370,760

RECIPROCATING RAM PUMP

John Maurice Towler, Summerbridge, near Harrogate, and Frank Hathorn Towler, Otley, England Application July 29, 1943, Serial No. 496,672
In Great Britain March 24, 1942

7 Claims. (Cl. 74—570)

This invention relates to an eccentric shaft assembly, for use in a reciprocating ram pump of the kind according to U. S. Patent No. 2,218,928 in which the inner bearing surface for the rollers of a roller bearing is constituted by the peripheral surface of an eccentric circular portion of the shaft which surface is made suitable to serve as the inner race of a roller bearing, the bearing being assembled on an intermediate eccentric portion of the shaft by positioning the rollers when the outer ring is located around the eccentric portion.

As described in the specification of the aforesaid patent an eccentric shaft assembly of the kind with which the present invention is concerned is principally used in pumps which are designed to work at speeds up to 1500 reciprocations per minute and at pressures of 5000 lbs. per square inch and over. For this reason it is essential that the distance separating adjacent eccentric portions shall be as small as possible in order to reduce the deflection under the load at the weaker sections between adjacent eccentric portions. It is, however, also essential that the contact area or lateral bearing surface of each roller bearing shall be sufficient adequately to support the load.

With the construction illustrated in the specification of U. S. Patent No. 2,218,928 it was only possible to provide for a contact area up to a maximum of one half the distance between centres of adjacent eccentric circular portions of the shaft. One of the objects of the present invention is to provide an improved arrangement of the shaft assembly according to said earlier patent which will render it possible to provide for a contact area up to approximately two-thirds of the distance between centres of adjacent eccentric circular portions.

Broadly the present invention consists of an eccentric shaft assembly of the type specified, for use in reciprocating ram pumps having three or more rams arranged with their axes in close juxtaposition, wherein at least the one or more intermediate bearings each comprise two sets of rollers arranged side by side to form a plurality of twin coaxial rollers providing a lateral contact area which is greater than the lateral distance between adjacent eccentric circular portions of the shaft.

In an eccentric shaft assembly according to one embodiment of the invention the outer ring of the bearing for each intermediate circular eccentric portion is grooved internally to accommodate the two sets of rollers side by side and lateral displacement of the assembled bearings is prevented by arranging that the side faces of the outer rings of all bearings shall abut one against the other and against the opposing faces of the two outer bearings in which the shaft is mounted.

If desired the eccentrics may be grooved instead of the outer rings. The former arrangement is, however, preferred, as grooving the eccentric portions of the shaft results in the production of sharp corners which might cause a fracture.

In order that the invention may be clearly understood and carried into effect an example of a shaft assembly according to the above preferred embodiment of the invention will now be described, by way of example, by aid of the accompanying drawing, in which:

The figure is a side elevation, partly in section, illustrating the eccentric shaft assembly.

The assembly illustrated is for a three throw pump and comprises a one-piece eccentric shaft $a$ having three integral eccentric portions, an intermediate portion $b$ and two outer portions $c$, which are separated from each other laterally by reduced portions $d$. Directly mounted upon each of these eccentric portions is a roller bearing each comprising an outer ring $e$ which is grooved internally to accommodate roller bearings $f$. The rollers in each bearing contact respectively with the internal periphery of the groove in the outer ring and with the peripheral surface of the eccentric portion thereby dispensing with the usual inner bearing ring.

In the example illustrated the intermediate bearing, which is mounted upon the eccentric portion $b$, is shown as being the only one provided with two sets of rollers arranged side by side within the accommodating groove in the outer ring whilst the two outer bearings have single sets of rollers of full width. In practice however the two outer bearings may also have rollers arranged as two sets similarly to that of the intermediate bearing.

As will be seen from the drawing the distance laterally between adjacent eccentric portions is less than the lateral contact area of the twin sets of rollers whilst the length of each roller in said twin sets of rollers is less than the width of the space between the adjacent eccentric portions. This is an essential feature of an eccentric shaft assembly according to the present invention and permits the assembly of the one or more intermediate bearings in the manner now to be described.

To assemble each intermediate bearing the outer ring $e$ is first threaded along the shaft until it overlaps a reduced part $d$ of the shaft and an intermediate circular eccentric portion $b$ for a distance equivalent to the bearing surface for one set of rollers. One set of rollers is then positioned within the interior groove of the ring by introducing the same, one at a time, into the part of the internal groove which overlaps the reduced part of the shaft and then pushing each roller laterally into the annular space between the opposing faces of the groove and the overlapped peripheral surface of the circular eccentric portion. The rollers of the other set comprising the bearing are then positioned one at a time within the remaining space in the groove which overhangs the reduced portion $b$ of the shaft so as to reside alongside the rollers of the first set and in axial alignment therewith. To prevent the rollers of the second set from falling out whilst the annular space is thus being filled a filling of grease or its equivalent is first put into the groove of the ring. When the complete ring of rollers is thus assembled the outer ring is moved laterally to bring both sets of rollers into rolling contact with the peripheral surface of the circular eccentric portion.

A similar procedure to the above is adopted for assembling the roller bearing on each other intermediate circular eccentric portion of the shaft and also the outer portions of the shaft when such are fitted with twin sets of rollers.

In the drawing the outer ends of the pump rams $g$ are shown as making direct contact with the peripheral surfaces of the outer rings of the roller bearings of the eccentric shaft assembly, an arrangement which, in practice, is preferred; but if desired the eccentrically mounted bearings may operate on the rams indirectly.

What we claim is:

1. In a reciprocating ram pump having at least three rams arranged with their axes in close juxtaposition, a shaft having a plurality of eccentric circular portions integral therewith for operating the respective rams, a roller bearing assembly for each of said eccentric portions comprising an outer ring and a plurality of rollers interposed between said outer ring and the peripheral surface of the eccentric shaft portion for rolling contact therewith, means for preventing lateral displacement of said rollers relative to said outer ring, at least each intermediate bearing assembly comprising two series of rollers mounted side by side to form a plurality of twin coaxial rollers providing a lateral contact surface of a length greater than the lateral distance between two adjacent eccentric portions of the shaft.

2. In a reciprocating ram pump having at least three rams arranged with their axes in close juxtaposition, a shaft having a plurality of eccentric circular portions integral therewith for operating the respective rams, a roller bearing assembly for each of said eccentric portions comprising an outer ring and a plurality of rollers interposed between said outer ring and the peripheral surface of the eccentric shaft portion for rolling contact therewith, means for preventing lateral displacement of said rollers relative to said outer ring, at least each intermediate bearing assembly comprising two series of rollers mounted side by side to form a plurality of twin coaxial rollers providing a lateral contact surface of a length greater than the lateral distance between two adjacent eccentric portions of the shaft, the longitudinal dimension of each roller being less than said lateral distance between adjacent eccentric portions.

3. In a reciprocating ram pump having at least three rams mounted with their axes in close juxtaposition, a shaft embodying a plurality of eccentric circular portions integral therewith for operating the respective rams, a roller bearing assembly for each of said eccentric portions comprising an outer ring and a plurality of rollers interposed between said outer ring and the peripheral surface of the eccentric portion for rolling contact with said surface, means for preventing lateral displacement of the rollers relative to said outer ring, at least each intermediate bearing assembly comprising two series of rollers mounted in side by side relationship to form a plurality of twin coaxial rollers providing a lateral contact surface of a length greater than the lateral distance between two adjacent eccentric shaft portions, and means for preventing lateral displacement of the bearing assemblies relative to the rams.

4. In a reciprocating ram pump having at least three rams mounted with their axes in close juxtaposition, a shaft assembly including a shaft embodying a plurality of eccentric circular portions integral therewith for operating the respective rams, a roller bearing assembly for each of said eccentric portions comprising an outer ring and a plurality of rollers interposed between said outer ring and the peripheral surface of the eccentric portion for rolling contact with said surface, at least each intermediate bearing assembly comprising two series of rollers mounted in side by side relationship to form a plurality of twin coaxial rollers providing a lateral contact surface of a length greater than the lateral distance between two adjacent eccentric portions of the shaft, said outer rings being disposed in lateral abutting relationship to each other and the outermost of said rings abutting against confining surfaces at each end of the shaft assembly to prevent lateral displacement of the bearing assemblies relative to the rams.

5. In a reciprocating ram pump having at least three rams mounted with their axes in close juxtaposition, a shaft assembly including a shaft embodying a plurality of eccentric circular portions integral therewith for operating the respective rams, a roller bearing assembly for each of said eccentric portions comprising an outer ring and a plurality of rollers interposed between said outer ring and the peripheral surface of the eccentric portion for rolling contact with said surface, a track in said outer ring for accommodating the rollers and prevent lateral displacement thereof relative to the ring, at least each intermediate bearing assembly comprising two series of rollers mounted in side by side relationship to form a plurality of twin coaxial rollers providing a lateral contact surface of a length greater than the lateral distance between two adjacent eccentric portions of the shaft, said outer rings being disposed in lateral abutting relationship to each other and the outermost of said rings abutting against confining surfaces at each end of the shaft assembly to prevent lateral displacement of the bearing assemblies relative to the rams.

6. In a reciprocating ram pump having a plurality of rams mounted with their axes in close juxtaposition, a shaft assembly comprising a shaft embodying a plurality of eccentric circular portions integral therewith for operating the respective rams; a roller bearing assembly for each of said eccentric shaft portions comprising an outer ring and a plurality of rollers interposed between said outer ring and the peripheral surface of the eccentric portion for rolling contact therewith, means for preventing lateral displacement of the rollers within the bearing assemblies, the outer rings being arranged in abutting relation to each other with the outermost of said rings in abutting relation to confining surfaces disposed at each end of the shaft assembly, to prevent lateral displacement of the bearing assemblies relative to the rams.

7. In a reciprocating ram pump of the character described having at least three rams mounted with their axes in close juxtaposition, a shaft assembly comprising a shaft having a plurality of eccentric circular portions integral therewith for operating the respective rams, a bearing assembly for each of said eccentric shaft portions comprising an outer ring and a plurality of rollers interposed between said outer ring and the peripheral surface of the eccentric shaft portion for rolling contact therewith, said outer rings being wider than the rollers and being arranged in lateral abutting juxtaposition, and said rollers providing a lateral contact surface of a length greater than the distance between two adjacent eccentric portions of the shaft, means for preventing lateral displacement of the rollers within the bearing assemblies, and surfaces disposed at the ends of the shaft assembly in abutting relation to the outermost of said rings, to maintain said rings in abutting juxtaposition and prevent lateral displacement of the bearing assemblies relative to the rams.

JOHN MAURICE TOWLER.
FRANK HATHORN TOWLER.